A. B. CADMAN.
GEAR.
APPLICATION FILED AUG. 10, 1911.
1,015,870.
Patented Jan. 30, 1912.
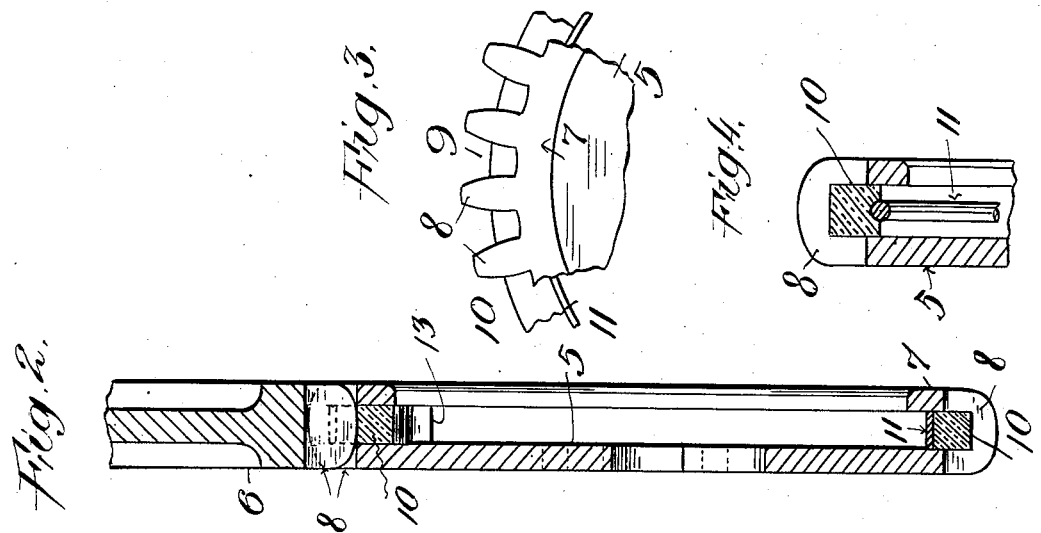
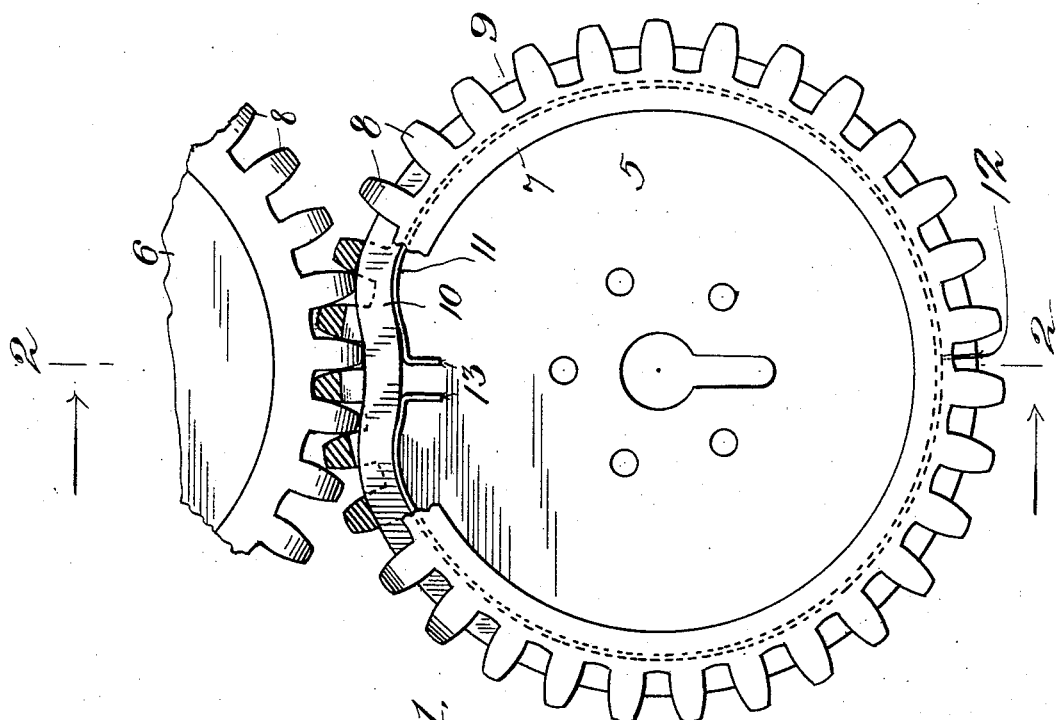
Witnesses:
Inventor
Addi Benjamin Cadman
By his Attorney
Samuel E. Darby

UNITED STATES PATENT OFFICE.

ADDI BENJAMIN CADMAN, OF BELOIT, WISCONSIN, ASSIGNOR TO WARNER INSTRUMENT COMPANY, OF BELOIT, WISCONSIN, A CORPORATION OF ILLINOIS.

GEAR.

1,015,870. Specification of Letters Patent. Patented Jan. 30, 1912.

Application filed August 10, 1911. Serial No. 643,273.

*To all whom it may concern:*

Be it known that I, ADDI BENJAMIN CADMAN, a citizen of the United States, residing at Beloit, county of Rock, State of Wisconsin, have made a new and useful Invention in Gears, of which the following is a specification.

This invention relates to gears, and particularly to gears employed in connection with the drive mechanism of speed indicating instruments.

The object of the invention is to provide means for preventing gears from chattering or rattling when intermeshed and operating in geared relation with other gears.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

In the accompanying drawing,—Figure 1 is a view in side elevation, parts broken out, and parts in section, showing intermeshed gears one of them embodying the principles of my invention. Fig. 2 is a view in section on the line 2—2 Fig. 1 looking in the direction of the arrows. Fig. 3 is a fragmentary view in side elevation of a portion of a gear showing the application thereto of devices embodying my invention. Fig. 4 is a broken view in section showing a slightly modified form of retaining device for the antichattering member.

In the Patent Number 840,977, granted January 8th, 1907, to Arthur P. Warner and Addi Benjamin Cadman, is set forth described and claimed a gear having its peripheral portion bent to form an open channel, the bent portion, forming the bottom and side walls of the channel, being kerfed or cut transversely through to form gear teeth. In the use of the gears, embodying the construction referred to, it has been found that the intermeshing of the gears, particularly when driven at high speeds, produces a rattling or chattering and hence an objectionable noise.

It is among the special purposes of my invention to provide means for deadening the chatter and noise and to eliminate this objectionable feature in intermeshing gears generally, and particularly in gears of the construction set forth, described and claimed in the patent referred to.

In accordance with the principles of my invention I form or provide the gear with a circumferential channel or groove at the base of its teeth, or in such proximity thereto as to communicate with the spaces between adjacent teeth. In the particular construction shown the overturned peripheral flange or edge forms the channel or groove. In this channel or groove I mount a suitable yielding substance, and which normally projects into the spaces between adjacent teeth, at the bases thereof, and I suitably retain the yielding body within said channel and in such relation as to take the end thrust or bearing of the teeth of the gear which intermeshes therewith, at the points of intermeshing contact, thereby imposing a desirable tension upon the gears and preventing them, when driven while in intermeshed relation, from chattering.

In the drawing 5—6 designate intermeshing gears one of them being formed from a body-part having its peripheral portion 7, bent over to form a substantially U-shaped channel. The teeth 8, of the gear are formed by cutting transverse grooves 9, across and through the bent over portion 7, the transverse cuts or kerfs extending through the base or bottom wall of the channel, as more fully described and claimed in the patent above referred to. It is obvious that the channel or groove may be formed in any other suitable or convenient manner. In accordance with my present invention, I place within the channel a yielding resilient or other suitable body 10 and arrange the same to normally bear against the base or bottom wall surface of the channel so as to extend into the spaces between the teeth.

In practice I have found that a leather ring will well answer the purpose but my invention is not to be limited in this respect.

If desired and in order to efficiently retain the body 10 in place within the channel, I employ a suitable spring 11, which may be of any suitable structure or arrangement. In the form shown in Fig. 2 the retaining device 11, is in the form of a band split to form a ring. A wire ring 11, see Fig. 4, may well answer the purpose.

In the operation of intermeshing gears embodying the construction above described when the teeth of one gear enter the spaces 9, of the other, the end surfaces of the gear teeth engage and press against the yielding body 10, which serves to take up any slack and to maintain a desirable tension upon the gears to prevent the teeth thereof from chattering or pounding against each other while the gears are being driven in intermeshed relation.

It may sometimes occur that the yielding body 10, may creep around the gear, that is, to travel in the channel in which it is placed, and at a different speed from that of the gear, with the result that the split ends of the yielding body, as indicated at 12, may eventually be brought opposite the ends of the split retaining device 11, 18, so that a depression of one or the other of the ends of the yielding body at this point will cause the same to be depressed relatively to one end or the other of the retaining device, thereby causing the ends of the retaining device to lap upon or past each other and consequently to eventually be forced out of retaining relation. To prevent this result I propose to bend or deflect the ends of the retaining device as indicated at 13, to a sufficient extent to prevent the one end from overriding upon the other. This relative creep of the yielding body within the channel of the gear is advantageous in that thereby wear on the yielding device by reason of the engagement therewith of the teeth of the intermeshed gear is greatly reduced.

Having now set forth the objects and nature of my invention and a construction embodying the principles thereof, what I claim as new and useful, and of my own invention and desire to secure by Letters Patent, is,—

1. The combination with a gear having its peripheral portion bent to form an open channel, the teeth of the gear being formed in said bent portion, of a yielding body mounted in said channel to take the bearing contact of the end surfaces of the teeth of an intermeshing gear.

2. The combination with a gear having its peripheral portion bent to form an open channel, the teeth of the gear being formed in said bent portion, of a yielding body mounted in said channel to take the bearing contact of the end surfaces of the teeth of an intermeshing gear and means for retaining said yielding body within said channel.

3. A gear having its peripheral portion bent over to form an open channel, with the teeth thereof formed in said bent over portion, in combination with a split ring seated within said channel and arranged to take the contact of the end surfaces of the teeth of an intermeshing gear.

4. A gear having its peripheral portion bent over to form an open channel, with the teeth thereof formed in said bent over portion, in combination with a split ring seated within said channel and arranged to take the contact of the end surfaces of the teeth of an intermeshing gear and means for retaining said split ring in place within said channel.

5. A gear having its peripheral portion bent over to form an open sided channel and having its teeth formed in the bent over portion, in combination with a yielding body located within said channel, a spring ring device for retaining said yielding body in position, the split ends of the retaining ring being bent or deflected.

6. The combination with a gear having a channel or groove at the bases of its teeth which communicates with the spaces between the teeth, of a yielding body mounted in said channel or groove, and arranged to take the end thrust bearing of the teeth of an intermeshing gear and means for retaining said yielding body in place within said channel or groove.

In testimony whereof I have hereunto set my hand in the presence of the subscribing witnesses, on this 4th day of August A. D., 1911.

ADDI BENJAMIN CADMAN.

Witnesses:
C. H. WARNER,
T. J. BURNS.